United States Patent Office 3,390,522
Patented July 2, 1968

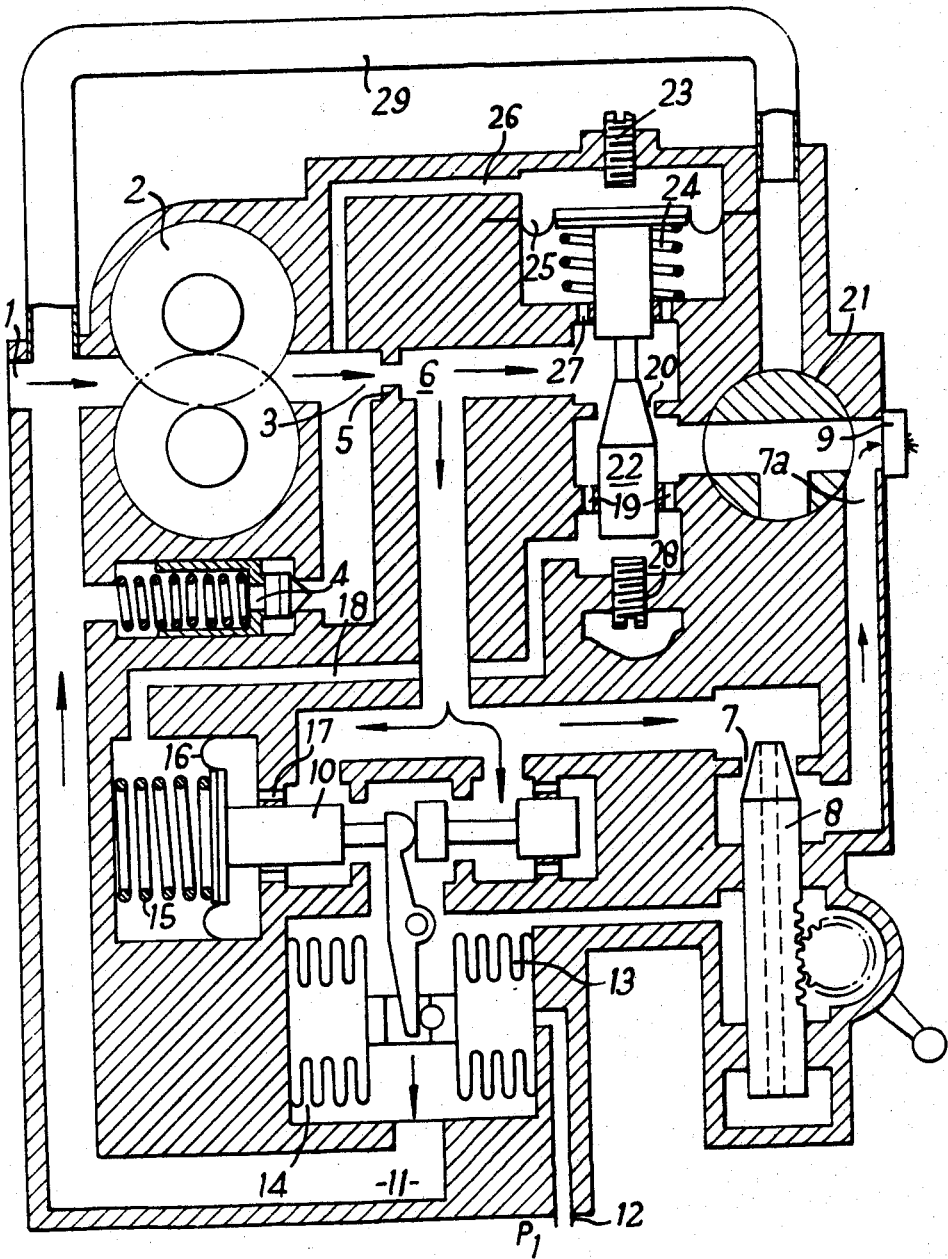

3,390,522
FUEL SYSTEMS FOR GAS TURBINE ENGINES OPERATING AT VARIABLE PRESSURE
John P. Whitehead, Ilford, England, assignor to The Plessey Company Limited, Ilford, England, a British company
Filed Nov. 16, 1966, Ser. No. 594,824
Claims priority, application Great Britain, Nov. 26, 1965, 50,480/65
2 Claims. (Cl. 60—39.14)

ABSTRACT OF THE DISCLOSURE

A fuel system for an aircraft engine including a positive-displacement fuel pump driven by said engine, a first fuel line with throttle means therein for controlling the fuel flow from said pump to the engine burners, valve means responsive to engine compressor intake pressure for controlling the pressure drop across said throttle means, a supplemental fuel line between said pump and burners in parallel arrangement with said first fuel line and with starting throttle means therein responsive to the rate of fuel flow supplied by said pump so that fuel flow through said starting throttle will progressively increase from zero to a maximum as the engine speed increases.

---

This invention relates to fuel systems for gas-turbine engines operating under variable atmospheric-pressure conditions, for example to fuel systems for aircraft lift-jet engines and other aircraft gas turbine which are so constructed that at and above idling speed they do not require a so-called acceleration control to avoid compressor surge or other phenomena due to excessive fuel supply. It is an object of the invention to provide an improved fuel system for gas-turbine engines of the kind specified which, while of relatively simple construction, is effective during starting of the engine and until idling speed is reached, to ensure reliable acceleration control under varying atmospheric-pressure conditions, a requirement which is also of importance in order to provide favourable conditions of fuel flow during light-up.

According to the present invention, a fuel system for an aircraft lift-jet engine or other turbine of the kind specified is provided with a supplementary starting orifice controlled by a valve responsive to the rate of the fuel flow supplied by a positive-displacement pump driven by the engine so that, as the engine speed increases from zero to idling speed, the fuel flow through the starting orifice will progressively increase from zero to a maximum determined preferably by an adjustable stop, said starting orifice being connected in parallel to a control throttle which is provided in the fuel line leading to the combustion chamber, and in which a pressure drop proportional to the compressor intake pressure of the turbine engine is maintained by a suitable valve device. During the starting of the engine this control throttle is maintained at its minimum aperture, so that in effect during starting the pressure difference controlled by the compressor intake pressure is utilised to supply fuel to the engine in two parallel streams, one through this constant minimum aperture and the other through the variable aperture of the starting orifice.

The accompanying drawing illustrates a fuel supply system for a gas turbine engine incorporating one embodiment of the present invention.

Referring now to the drawing, fuel from a supply line 1 is delivered by a displacement-type fuel pump 2 to a chamber 3 provided with a safety relief valve 4 which is arranged to be closed except when the pump-delivery pressure reaches a safety limit. From this chamber fuel passes through a restrictor 5 to a passage 6 having one branch which leads, via an aperture 7 controlled by a manually operable control valve 8 and a fuel-delivery line 7a to a fuel-burner system 9, while another branch allows excess fuel to return under the control of a slide valve 10, by a spill passage 11 to the pump inlet 1. The slide valve 10 is urged in the closing direction by the intake pressure $P_1$ of the air compressor of the turbine engine, this pressure being admitted through a line 12 to a capsule 13 acting against a vacuum capsule 14, and assisted by a spring 15 while being opposed by the pressure drop in the aperture 7, acting upon a diaphragm 16, to one side of which acts the pressure upstream of the aperture 7 is admitted through passages 17, while the chamber at the other side of this diaphragm communicates by a line 18 and bores 19 with the fuel-delivery line 7a leading from the aperture 7 to the burners 9.

In order to provide a suitable amount of fuel during starting of the engine to ensure light-up of the fuel flow and obtain good acceleration without the risk of compressor surge, additional fuel is supplied under starting conditions through a starting orifice 20 which leads from a branch of the line 6 via a stopping valve 21, to the engine burners 9. The starting orifice 20 is controlled by a valve element 22 which, when the engine and thus the pump 2 is stationary, is held by a spring 24 in a closed or minimum-aperture position adjustable by a set screw 23; when during starting the engine begins to move and thus the pump 2 begins to deliver fuel through the restrictor 5, the valve element 22 is progressively moved in the opening direction by the action of the pressure drop across the restrictor 5 upon a diaphragm 25, to one side of which the pressure upstream of the restrictor is admitted through a passage 26, while the chamber at the other side of the diaphragm 25 communicates with a branch of line 6 through perforations 27. A second set screw 28 forms an adjustable stop limiting the movement of the valve element 22 in the opening direction, and thus the maximum area of the orifice 20, which is arranged to be reached at approximately the idling speed of the engine.

Since the inlet side of the orifice 20 communicates by the passage 6 with the inlet side of the orifice 7, and the outlet side of orifice 20 communicates freely with the outlet side of the orifice 7, it will be readily appreciated that the slide valve 10 is effective to control the pressure drop across the orifice 20 as well as that across orifice 7 in such manner as to maintain that pressure drop at a value proportional to compressor intake pressure, thus providing a safeguard against an excessive fuel supply when the engine is to be started at high altitudes.

The stopping valve 21 is illustrated as a three-way cock and is shown in the figure in the position it assumes during the running of the engine. It will be readily appreciated that, when the cock stop 21 is turned by 90 degrees in an anti-clockwise direction or by 180 degrees, it will allow fuel from the burner inlet to return freely into the pump inlet via a return line 29, thus ensuring immediate cessation of fuel injection and also releasing the pressure from the outlet side of aperture 7 and if turned by 180 degrees also of aperture 20.

It will be appreciated that at idling speed and at all speeds above idling speed the maximum area of orifice 20 will be effective to admit fuel to the burners 9 in parallel to the admission through aperture 7, and that this will have to be taken into consideration in determining the idling and operating positions of the valve 8, which for this reason may be arranged to be completely closed in its idling position.

What I claim is:

1. A fuel system, more particularly for an aircraft lift-jet turbine engine, comprising a positive-displacement fuel pump driven by the turbine engine, burner means, a fuel line leading from the pump to the burner means, a control throttle arranged in said line, a valve device maintaining in said control throttle a pressure drop proportional to the compressor intake pressure of the turbine engine, a supplementary starting orifice which is connected in parallel to the control throttle and a valve controlling said starting orifice and responsive to the rate of the fuel flow supplied by the said pump so that, as the engine speed increases from zero to idling speed, the fuel flow through the starting orifice will, at a given pressure drop, progressively increase from zero to a maximum.

2. A fuel system as claimed in claim 1, including an adjustable stop limiting the opening movement of the flow-responsive valve.

No references cited.

JULIUS E. WEST, *Primary Examiner.*